(12) United States Patent
Rehn et al.

(10) Patent No.: US 11,954,617 B2
(45) Date of Patent: *Apr. 9, 2024

(54) METHOD FOR ASSIGNING WORK TO USER AND APPARATUS THEREOF

(71) Applicant: Coupang Corp., Seoul (KR)

(72) Inventors: Erik Rehn, Seoul (KR); Young Shin Kang, Seoul (KR); Yul Hee Lee, Seoul (KR)

(73) Assignee: Coupang Corp., Seoul (KR)

( * ) Notice: Subject to any disclaimer, the term of this patent is extended or adjusted under 35 U.S.C. 154(b) by 147 days.

This patent is subject to a terminal disclaimer.

(21) Appl. No.: 17/446,786

(22) Filed: Sep. 2, 2021

(65) Prior Publication Data

US 2021/0398042 A1 Dec. 23, 2021

Related U.S. Application Data

(63) Continuation of application No. 16/996,763, filed on Aug. 18, 2020, now Pat. No. 11,182,705.

(30) Foreign Application Priority Data

Mar. 24, 2020 (KR) .......................... 10-2020-0035699

(51) Int. Cl.
*G06Q 10/06* (2023.01)
*G06F 9/54* (2006.01)
(Continued)

(52) U.S. Cl.
CPC ....... *G06Q 10/06311* (2013.01); *G06F 9/542* (2013.01); *G06Q 10/06316* (2013.01); *G06Q 10/1097* (2013.01)

(58) Field of Classification Search
CPC .................................................. G06Q 10/06
See application file for complete search history.

(56) References Cited

U.S. PATENT DOCUMENTS 5,963,911 A * 10/1999 Walker .................... G06Q 10/06
 700/99
8,543,438 B1 * 9/2013 Fleiss ................. G06Q 10/0631
 705/7.17

(Continued)

FOREIGN PATENT DOCUMENTS

CN 109242320 A 1/2019
CN 110348671 A 10/2019

(Continued)

OTHER PUBLICATIONS

Monica.D, Devi.S, Subashini.D, R.Devi, Scheduling and Resource Allocation for Employees in Software Projects, International Journal of Advanced Computational Engineering and Networking, vol. 2, Issue-5, May 2014. (Year: 2014).*

(Continued)

*Primary Examiner* — Kurtis Gills
(74) *Attorney, Agent, or Firm* — Knobbe, Martens, Olson & Bear, LLP

(57) ABSTRACT

According to an embodiment, a method of allocating a job to a user comprising: receiving an allocation request signal from a terminal of the user; determining job processing information related to a job processed by the user; allocating at least one job among a plurality of jobs to the user based on the job processing information; and transmitting allocation information indicating the allocated at least one job to the terminal in response to the reception of the allocation request signal may be provided. According to an embodiment, a job allocation apparatus for performing the above-described job allocation method may also be provided. According to an embodiment, a computer readable recording medium containing a computer program for performing job allocation method may be provided.

18 Claims, 9 Drawing Sheets

(51) Int. Cl.
*G06Q 10/0631* (2023.01)
*G06Q 10/1093* (2023.01)

(56) References Cited

U.S. PATENT DOCUMENTS

| | | | | |
|---|---|---|---|---|
| 2001/0049619 | A1* | 12/2001 | Powell | G06Q 10/063112 |
| | | | | 705/7.16 |
| 2004/0236638 | A1 | 11/2004 | Eguchi et al. | |
| 2007/0143764 | A1* | 6/2007 | Kern | G06Q 10/06 |
| | | | | 718/104 |
| 2012/0089432 | A1* | 4/2012 | Podgurny | G06Q 10/06311 |
| | | | | 705/7.13 |
| 2016/0139959 | A1* | 5/2016 | Iwata | G06F 9/5027 |
| | | | | 718/103 |
| 2018/0060744 | A1* | 3/2018 | Achin | G06N 5/04 |
| 2018/0204171 | A1* | 7/2018 | Cao | G06Q 10/087 |
| 2018/0260746 | A1* | 9/2018 | Xiong | G06F 40/40 |
| 2020/0074361 | A1 | 3/2020 | Akatsuka et al. | |
| 2020/0160250 | A1* | 5/2020 | Van Pelt | G06Q 10/06398 |
| 2020/0311632 | A1* | 10/2020 | Beck | G06Q 10/06311 |

FOREIGN PATENT DOCUMENTS

| | | | |
|---|---|---|---|
| CN | 110838047 | A | 2/2020 |
| JP | 2002-056156 | | 2/2002 |
| JP | 2003-006393 | A | 1/2003 |
| JP | 2013-097625 | | 5/2013 |
| JP | 2017-058707 | | 3/2017 |
| JP | 2017-134619 | A | 8/2017 |
| JP | 6214835 | | 10/2017 |
| JP | 2018-092971 | A | 6/2018 |
| JP | 2019-082784 | A | 5/2019 |
| JP | 2019-144632 | A | 8/2019 |
| JP | 2020-003895 | | 1/2020 |
| JP | 2020-035330 | A | 3/2020 |
| KR | 2018-0136295 | | 12/2018 |
| WO | WO 2016-208030 | | 12/2016 |
| WO | WO-2020053737 A1 * | 3/2020 | ............ G06Q 10/06 |

OTHER PUBLICATIONS

International Search Report received in PCT/KR2020/011778 dated Dec. 17, 2020.

* cited by examiner

METHOD FOR ASSIGNING WORK TO USER AND APPARATUS THEREOF

CROSS-REFERENCE TO RELATED APPLICATIONS

This application is a continuation of U.S. patent application Ser. No. 16/996,763, filed on Aug. 18, 2020, which claims priority to Korean Application No. 10-2020-0035699, filed Mar. 24, 2020, each of which is incorporated herein by reference in its entirety.

BACKGROUND

Technical Field

The present disclosure relates to a method and apparatus for allocating jobs to a user requesting allocation.

Description of the Related Art

As e-commerce is implemented in earnest and many users purchase goods through the Internet, inventory management in the process of loading and moving goods for the sale and shipping process of goods is also related to the speed and accuracy of the process of selling goods to users.

A goods distribution company may distribute goods and manage inventory by employing a large number of workers to perform numerous jobs necessary for distribution of goods. In this process, various jobs such as receiving and shipping of numerous items loaded in the warehouse must be performed. In order to perform various kinds of work necessary for the distribution of goods, the goods distribution company can temporarily hire individuals in the form of outsourcing, as well as employees who are officially employed by the company.

Since the types, locations, and inclusion relations of the goods storage locations operated by the goods distribution company are very diverse, and the types of jobs performed in these goods storage locations are also very diverse, it is necessary for the goods distribution company to allocate jobs to be efficiently performed in the right place at the right time.

SUMMARY

Technical Goals

It is an object of the present disclosure to enable a goods distribution company to efficiently allocate jobs required for goods distribution to individuals, thereby efficiently performing jobs required for goods distribution.

It is another object of the present disclosure to enable a goods distribution company to allocate an optimal job appropriate for an individual worker who has requested to be allocated to a job required for goods distribution to the goods distribution company, so that the efficiency of job performance increases and, at the same time, the job that needs to be performed for the goods distribution company can be performed in the right place at the right time.

The objects that can be derived from the following embodiments are not limited to the above-mentioned objects, and other objects and advantages which are not mentioned can also be understood by the following description, and more clearly understood by the embodiments. Further, it will be readily appreciated that the objects and advantages that can be derived from the embodiments can be realized by means of the claims and combinations thereof.

Technical Solutions

According to an embodiment, there may be provided a method of allocating a job to a user, the method including: receiving an allocation request signal from a terminal of the user; determining job processing information related to a job processed by the user; allocating at least one job among a plurality of jobs to the user based on the job processing information; and transmitting allocation information indicating the allocated at least one job to the terminal in response to the reception of the allocation request signal.

According to an embodiment, there may be provided an apparatus for allocating a job to a user, the apparatus including: a communication component configured to receive an allocation request signal from a terminal of the user; and a controller configured to determine job processing information related to a job processed by the user, allocate at least one job among a plurality of jobs to the user based on the job processing information, and transmit allocation information indicating the allocated at least one job to the terminal in response to the reception of the allocation request signal.

Effects

By using the job allocation method and apparatus according to the present disclosure, various jobs necessary for goods distribution can be efficiently performed in the right place at the right time.

By allocating the appropriate job to the user who requested the job allocation using the job allocation method and apparatus according to the present disclosure, the user can efficiently perform the job, thereby improving the work efficiency, and the goods distribution company that has allocated the job can also process jobs quickly and efficiently by allocating jobs that users can perform efficiently.

In addition to the above-described effects, specific effects that can be derived will be described together while describing specific details for carrying out the invention.

DETAILED DESCRIPTION

Figure 1:
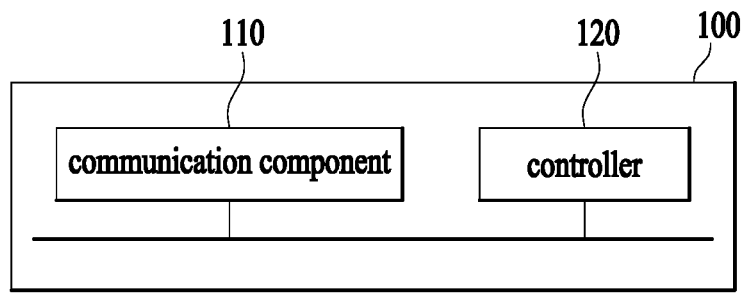
FIG. 1 is a block diagram of a job allocation apparatus according to an embodiment.

Hereinafter, embodiments of the present disclosure will be described in detail with reference to the drawings so that those skilled in the art related to the embodiments can easily implement the embodiments. The following embodiments may be implemented in various different forms and are not limited to the embodiments described herein.

The term "unit" added to a component used in the following description is given or mixed in consideration of only the ease of preparation of the specification, and does not have a meaning or a role distinguished from each other in itself.

For clarity, parts irrelevant to the description have been omitted, and the same reference numerals are used for the same or similar elements throughout the specification. In addition, some embodiments will be described in detail with reference to exemplary drawings. In adding reference numerals to the components of each drawing, the same components may have the same reference numerals as possible even though they are displayed on different drawings. In addition, in describing the present disclosure, when it is determined that detailed descriptions of related well-known configurations or functions may obscure the gist of embodiments, detailed descriptions thereof may be omitted.

In describing the components of the embodiments, terms such as first, second, A, B, (a), and (b) may be used. These terms are only for distinguishing the component from other components, and the essence, order, sequence, or number of the component is not limited by those terms. When described as being "linked", "coupled" or "connected" between any components, it should be understood that they may be directly linked or connected, other components may be "interposed" between them, or they may be "linked", "coupled" or "connected" through other components.

In the present disclosure, terms such as "include", "comprise" or "have" are intended to indicate that there are features, numbers, steps, operations, components, parts, or combinations thereof described in the specification, and it should be understood that the possibility of the existence or addition of one or more of other features, numbers, steps, operations, components, parts, or combinations thereof is not excluded in advance.

In addition, in implementing the present disclosure, components may be divided and described for convenience of description, but these components may be implemented in one device or module, or one component may be implemented by being divided into multiple devices or modules.

FIG. 1 is a block diagram of a job allocation apparatus 100 according to an embodiment.

According to an embodiment, the job allocation apparatus 100 may include a communication component 110 for receiving an allocation request signal from a terminal of a user and a controller 120, which is configured to determine job processing information related to a job processed by the user, allocate at least one job corresponding to the job processing information among a plurality of jobs to the user, and transmit allocation information indicating the allocated at least one job in response to reception of the allocation request signal to the terminal.

According to an embodiment, the job allocation apparatus 100 may further comprise a storage unit (not shown) for storing a variety of information for performing a job allocation method. According to an embodiment, the storage unit (not shown) may include at least one of a RAM, a ROM, a CPU, a GPU (Graphic Processing Unit) or a bus. According to an embodiment, the job allocation apparatus 100 may use a storage unit (not shown) that is implemented in a manner interworking with a server as a separate database located outside the job allocation apparatus 100. According to an embodiment, the communication component 110 of the job allocation apparatus 100 may be configured to transmit and receive predetermined information from an external server as a storage unit (not shown).

According to an embodiment, the controller 120 may control components included in the job allocation apparatus 100 to perform various embodiments that can be performed by various components included in the job allocation apparatus 100. According to an embodiment, the controller 120 may include at least one of a RAM, a ROM, a CPU, a GPU, or a bus, which may be connected to each other. According to an embodiment, wired communication technology may be used by the communication component 110 to obtain predetermined information, and wireless communication technology such as GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), IrDA (Infrared Data Association), ZigBee, NFC (Near Field Communication) can also be used.

Various job allocation methods that can be performed by the job allocation apparatus 100 comprising the communication component 110 and the controller 120 will be described later in detail based on FIGS. 2 to 7C.

Figure 2:
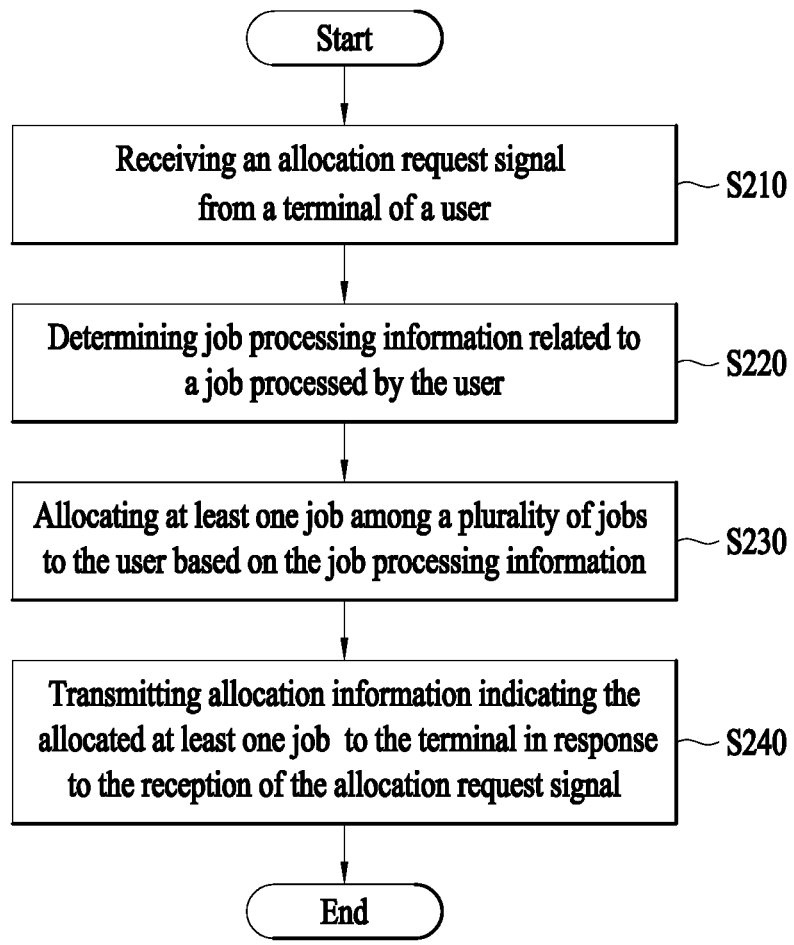
FIG. 2 is a flowchart of a job allocation method according to an embodiment.

FIG. 2 is a flowchart of a job allocation method according to an embodiment.

In operation S210, the job allocation apparatus 100 may receive an allocation request signal from a terminal of a user.

According to an embodiment, the communication component 110 may receive various signals from the outside and provide them to the controller 120 so that the controller 120 performs predetermined processing.

According to an embodiment, the allocation request signal received by the communication component 110 may include information about the user of the terminal that has transmitted the allocation request signal. For example, the allocation request signal may include various types of information that can identify the user and/or the user's terminal, such as the user's terminal serial number, the user's personal information, the user's ID, and the like, and the job allocation apparatus 100 that has received the allocation request signal may determine which user has transmitted the allocation request signal.

According to an embodiment, the allocation request signal received by the communication component 110 may include information indicating whether the user is a new user or an existing user. According to an embodiment, when it is indicated that the user who transmitted the allocation request signal is a new user, the controller 120 may perform a registration process of the new user, a separate job allocation method for the new user, etc. through a separate algorithm preset for the new user.

According to an embodiment, a separate job allocation process for a new user may correspond to a process in which additional conditions are added while using various job allocation methods for an existing user presented in the present disclosure. For example, when a job allocation request is received from a new user's terminal, the controller 120 may limit jobs to be allocated on a daily basis without allocating jobs to a plurality of consecutive days or impose restrictions such as preventing the user from modifying the job to be allocated, in allocating jobs to new users. However, this embodiment is an exemplary method for explaining that a job allocation method for a new user may impose additional conditions or restrictions on a job allocation method for an existing user presented in the present disclosure, and it should not be interpreted as being limited to this.

In operation S220, the job allocation apparatus 100 may determine job processing information related to a job processed by the user according to an embodiment.

According to an embodiment, the communication component 110 that has received the allocation request signal from the user's terminal may deliver the allocation request signal to the controller 120. According to an embodiment, when the allocation request signal is received from the user's terminal, the controller 120 may acquire a variety of information related to a job processed by the user corresponding to the allocation request signal. According to an embodiment, information related to the job processed by the user may be stored in a storage unit (not shown) included in the job allocation apparatus 100 or may be stored in a database external to the job allocation apparatus 100.

According to an embodiment, the controller 120 may determine job processing information by determining which job the user corresponding to the allocation request signal has processed. According to an embodiment, the job processing information may be information indicating at least one job type processed by the user and job throughput for each job type. According to an embodiment, the job processing information may indicate job throughput units per hour (hereinafter, it may be referred to as "UPH") for a job type. That is, the job processing information may include information indicating what type of job the user has processed and the speed at which the job type is processed.

According to an embodiment, there may be a plurality of types of jobs that the user can handle. According to an embodiment, each of the plurality of job types may include at least one sub-job type included in each job type. For example, the plurality of job types that can be handled by the user and at least one sub-job type included in each job type may be related as shown in Table 1 below. According to an embodiment, the job type called "picking" can include sub-job types such as "bulk", "multi", "single", etc., where the "bulk" type indicates the picking job for items packaged in bulk, the "multi" type indicates the picking job for boxes containing multiple items, and the "single" type indicates the picking job for a single item. However, the job types and sub-job types shown in Table 1 are exemplary to show the inclusion relationship between the job types and the sub-job types, and it should not be interpreted as being limited to this.

TABLE 1

| Job type | Sub-job type | Job type | Sub-job type |
|---|---|---|---|
| Picking | Bulk | Receive | PS |
| | Single | | WS |
| | Multi | | |
| Packing | Support | Stow | Consolidation |
| | Training | | Support |
| Rebin | Invoice | Unload | Spector |
| | Line | | Sorter |

According to an embodiment, the controller 120 may determine job processing information indicating the job throughput for each job type. When the number of sub-job types included in the job type is set to be plural, the controller 120 may determine job processing information indicating the job throughput for each sub-job type. According to an embodiment, when the number of sub-job types included in the job type is set to be plural, the job processing information for the job type may be determined based on the job throughput for each sub-job type.

According to an embodiment, the absolute size of job processing information may vary significantly depending on the number and type of sub-job types included in each job type. The job throughput units per hour expressed in the job processing information may be expressed based on the number of items that can be processed by the user per hour. Accordingly, it may be necessary to consider that the speed of performing a job may vary depending on the job intensity, the volume of goods, and the weight of goods according to various sub-job types included in the same job type. Therefore, the job processing speed may vary widely in variance for each sub-job type, which makes it difficult to compare sub-job types with different variances. For desirable comparison and calculation between these sub-job types, the controller 120 may normalize the job throughput units per hour (i.e. job processing speed) for each sub-job type, according to an embodiment. For example, the normalization of the job throughput units per hour of the sub-job type may be as shown in Table 2 below.

TABLE 2

| UPH(MUPH) of Multi sub-job type | 8.3 | 12.1 | 15.0 | 16.8 | — | 63.5 | 68.2 | 75.9 |
|---|---|---|---|---|---|---|---|---|
| Normalized UPH(NMUPH) of Multi sub-job type | 0.01 | 0.02 | 0.03 | 0.04 | | 0.98 | 0.99 | 1 |
| UPH(MUPH) of Single sub-job type | 12.2 | 16.8 | 20.5 | 25.8 | | 94.2 | 98.2 | 101.1 |
| Normalized UPH(NMUPH) of Single sub-job type | 0.01 | 0.02 | 0.03 | 0.04 | | 0.98 | 0.99 | 1 |

According to an embodiment, the controller 120 may perform quantitative comparison between different sub-job types and calculation based thereon by using job processing information including the job throughput units per hour for each job type determined based on the normalization process. Through this, it is possible to desirably determine the job throughput units per hour for the job type including the corresponding sub-job type.

According to an embodiment, a job type (for example, picking in Table 1) including a plurality of sub-job types (for example, bulk, multi, and single in Table 1) may be normalized through the following Equation 1.

$$NUPH_{picking} = NBUPH_{picking} * \frac{b_t}{m_t + s_t + b_t} + NMUPH_{picking} * \frac{m_t}{m_t + s_t + b_t} + NSUPH_{picking} * \frac{s_t}{m_t + s_t + b_t} \quad [\text{EQUATION 1}]$$

Here, $m_t$ represents work hours for "multi" type among sub-job types, $s_t$ represents work hours for "single" type among sub-job types, $b_t$ represents work hours for "bulk" type among sub-job types, and $NBUPH_{picking}$ represents the normalized job throughput units per hour for "bulk" among the types of sub-jobs included in the picking type among the job types, $NMUPH_{picking}$ represents the normalized job throughput units per hour for "multi" among the types of sub-jobs included in the picking type among the job types, and NSUPH$_{picking}$ represents the normalized job throughput units per hour for "single" among the types of sub-jobs included in the picking type among the job types.

According to an embodiment, the controller 120 may determine the job throughput units per hour for each of the plurality of sub-job types included in the job type based on the above equation, and may determine the performance result of normalization of the job throughput units per hour of the corresponding job type based on the job throughput units per hour for each of the plurality of sub-job types. For example, the result of determining the job throughput units per hour for a specific type of job based on the job throughput units per hour for each of a plurality of sub-job types may be as shown in Table 3 below.

TABLE 3

| User ID | Picking | | | | | | | |
|---|---|---|---|---|---|---|---|---|
| | Bulk | | | Multi | | | Single | |
| 41178194 | UPH | NBUPH | TIME | UPH | NMUPH | TIME | UPH | NSUPH | TIME |
| | 150.12 | 0.57 | 12 | 50.3 | 0.81 | 742 | 66.54 | 0.74 | 416 |

$$NUPH_{picking} = 0.57 * \frac{12}{1170} + 0.81 * \frac{742}{1170} + 0.74 * \frac{416}{1170} = 0.78$$

According to an embodiment, the controller 120 may determine job processing information including the normalized job throughput units per hour for at least one job type including at least one sub-job type, and the job processing information determined by the controller 120 is a result of normalization of the job throughput units per hour for a plurality of job types, which may have a form of $N_i$= [NUPH$_{picking}$,NUPH$_{packing}$,NUPH$_{stow}$, . . . ] (here, i represents a user who sent an allocation request signal). According to an embodiment, the job allocation apparatus 100 may determine the job processing information, i.e. Ni, determined as above, as a first score, and the first score may be utilized to allocate a job for the user.

In the operation S230, the job allocation apparatus 100 may allocate at least one job corresponding to the job processing information among a plurality of jobs to the user according to an embodiment.

According to an embodiment, the controller 120 may allocate a job that the user can perform most efficiently based on the job processing information in the operation S220. For example, the controller 120 may allocate a job type indicating the highest job throughput units per hour to the user using the job processing information corresponding to the user who requested to allocate the job. Accordingly, the job allocation apparatus 100 may improve job processing efficiency by allocating the user to jobs that the user can perform most efficiently.

According to an embodiment, the controller 120 may preset at least one job for allocation to a user. According to an embodiment, the controller 120 may set a job for allocation to a user in advance according to various criteria such as a location, a date, a time, and an allocation target number. According to an embodiment, the controller 120 determines whether or not it is preset for allocation of at least one job at the time when an allocation request signal is received from the user's terminal, and allocates the job to the user only when there is at least one job that is preset to be performed.

According to an embodiment, the controller 120 may preset various criteria such as a location, a date, a time, and an allocation target number for at least one sub-job type included in each job type. According to another embodiment, the controller 120 may preset various criteria such as a location, a date, a time, and an allocation target number only for a job type which is a higher level that includes at least one sub-job type.

According to an embodiment, the controller 120 may preset an allocation target number for each of at least one job to be performed. According to an embodiment, the controller 120 may determine the number of persons who have been allocated for the job to be performed, i.e., the actual allocated number, and the actual allocated number may correspond to the number of other persons who have already been allocated to that job at the time when the allocation request signal is received.

According to an embodiment, the controller 120 may determine a second score based on the allocation target number and the actual allocated number for each of the jobs to be performed. For example, the controller 120 may determine the second score based on a ratio of the difference between the allocation target number and the actual allocated number and the allocation target number for each of the jobs to be performed. According to an embodiment, the controller 120 may determine the second score based on Equation 2 below.

$$R = \left[ \frac{Target_{picking} - actual_{picking}}{Target_{picking}}, \frac{Target_{packing} - actual_{packing}}{Target_{packing}}, \ldots \right] \quad [\text{EQUATION 2}]$$

Here, "Target" represents the allocation target number, "actual" represents the actual allocated number, and R represents the second score including a ratio of the difference between the allocation target number and the actual allocated number and the allocation target number for each of a plurality of jobs of each job type. As described above, the second score may be understood as a ratio of the number of persons who have not yet been allocated as much as the allocation target number compared to the allocation target number at the time when the allocation request signal is received. Therefore, the controller 120 may determine that the second score for the corresponding job has a large value when the number of persons who have not yet been allocated for a specific job is relatively large considering the allocation target number.

In operation S240, the job allocation apparatus 100 may transmit allocation information indicating at least one job allocated to the terminal in response to receiving the allocation request signal, according to an embodiment. According to an embodiment, a user who transmits an allocation request signal through the terminal to the job allocation apparatus 100 may be provided with various pieces of information about what kind of job is allocated to him/her based on the received allocation information. According to an embodiment, the allocation information may include information on or regarding a work date, a work time, a work location, and so on.

Figure 3:
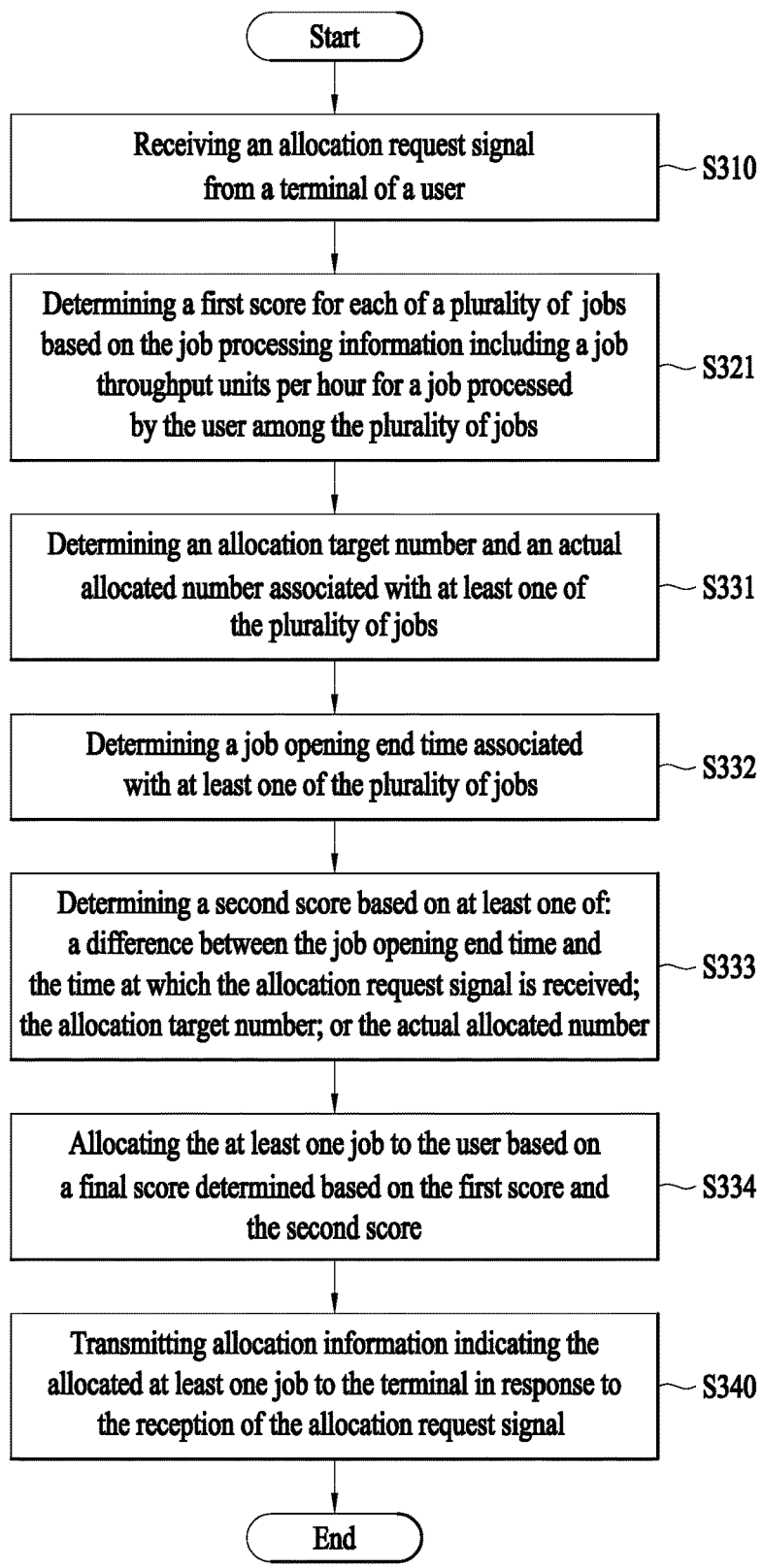
FIG. 3 is a flowchart of a job allocation method for allocating at least one job to a user based on the first score determined based on the job processing information and the second score determined based on the job opening end time according to an embodiment.

FIG. 3 is a flowchart of a job allocation method for allocating at least one job to a user based on the first score determined based on the job processing information and the second score determined based on the job opening end time according to an embodiment. Features of operation S310 and S340 of FIG. 3 may be the same or similar to those of operation S210 and S240 of FIG. 2, and thus detailed description thereof will be omitted.

In operation S321, the job allocation apparatus 100 may determine a first score for each of a plurality of jobs based on job processing information including job throughput units per hour for a job processed by a user among a plurality of jobs according to an embodiment. Since the method for determining the first score has been described above, detailed description is omitted.

In operation S331, the job allocation apparatus 100 may determine an allocation target number and an actual allocated number associated with at least one of the plurality of jobs. Considering the information on the allocation target number and the actual allocated number in order to determine the second score for each job is described above through other embodiments, detailed description is omitted.

In operation S332, the job allocation apparatus 100 may determine a job opening end time associated with at least one of the plurality of jobs according to an embodiment.

According to an embodiment, the controller 120 may preset a period for allocating jobs to a user according to various criteria such as a location, a date, a time, and an allocation target number. According to an embodiment, the controller 120 may set a job opening end time in advance for a specific job and allocate the job to the user until the job opening end time. That is, the job allocation apparatus 100 does not allocate a job when job vacancy has already been filled or when the job opening end time has arrived, as the job opening end time for each job is set differently, and therefore, the job of the required job type may only be allocated to the user based on the time at which the allocation request signal is received.

In operation S333, the job allocation apparatus 100 may determine the second score based on the difference between the job opening end time and the time at which the allocation request signal is received, according to an embodiment. According to an embodiment, the job opening end time may be understood as a preset date or time, and thus is not necessarily interpreted as a time on a specific date.

According to an embodiment, the controller 120 may determine a difference between the job opening end time for job allocation and the current time when the allocation request signal is received in operation S310. Based on this difference, the controller 120 may determine how much time remains until the job opening end time. It can be determined that the less time left until the job opening end time, the greater the need to allocate the job. According to an embodiment, the controller 120 may determine the size of the second score to be larger as the time remaining until the job opening end time is shorter (i.e., the difference between the job opening end time and the time when the allocation request signal is received is smaller).

In operation S334, the job allocation apparatus 100 may allocate at least one job to the user based on the final score determined based on the first score and the second score according to an embodiment.

According to an embodiment, the first score may be determined based on the job processing information, and the second score may be determined based on the time remaining until the job opening end time, the allocation target number, and the actual allocated number. Accordingly, the job allocation apparatus 100 may determine that the final score is greater as the job processing speed of the user who transmits the allocation request signal is faster or the achievement rate of the allocation target number of the preset job is less. For example, the controller 120 may determine the final score by adding the first score and the second score.

According to an embodiment, in order to adjust the value of the second score based on the difference between the job opening end time and the time at which the allocation request signal is received, the controller 120 may multiply a predetermined weight by a value (that is, R in Equation 2) determined based on the allocation target number and the actual allocated number, and it may determine that the predetermined weight has a smaller value as the difference between the job opening end time and the time when the allocation request signal is received is greater. Accordingly, the controller 120 may determine the final score based on the second score, which is a result of multiplying the value R determined based on the allocation target number and the actual allocated by the predetermined weight.

According to an embodiment, the controller 120 may differently determine a weight to multiply the second score according to a result of comparing the difference between the job opening end time and the time at which the allocation request signal is received with the preset threshold K. For example, the controller 120 may determine a weight that is multiplied by the second score to be larger when the difference between the job opening end time and the time when the allocation request signal is received is smaller than the threshold K than when that is larger than the threshold K. According to an embodiment, the controller 120 may set the weight multiplied by the second score to 1 when the difference between the job opening end time and the time when the allocation request signal is received is equal to the threshold K.

According to an embodiment, the controller 120 may determine the final score by adding the first score and the second score multiplied by the predetermined weight.

According to an embodiment, when t is defined as indicating the difference between the job opening end time and the time at which the allocation request signal is received, and K is defined as indicating a preset threshold, the controller 120 may use a preset function f(t−K) which has an input of the difference between t and K to determine the second score, for example, f(t−K)*R. According to an embodiment, various types of functions to output a larger value as t−K is smaller may be used as f(t−K).

Figure 4:
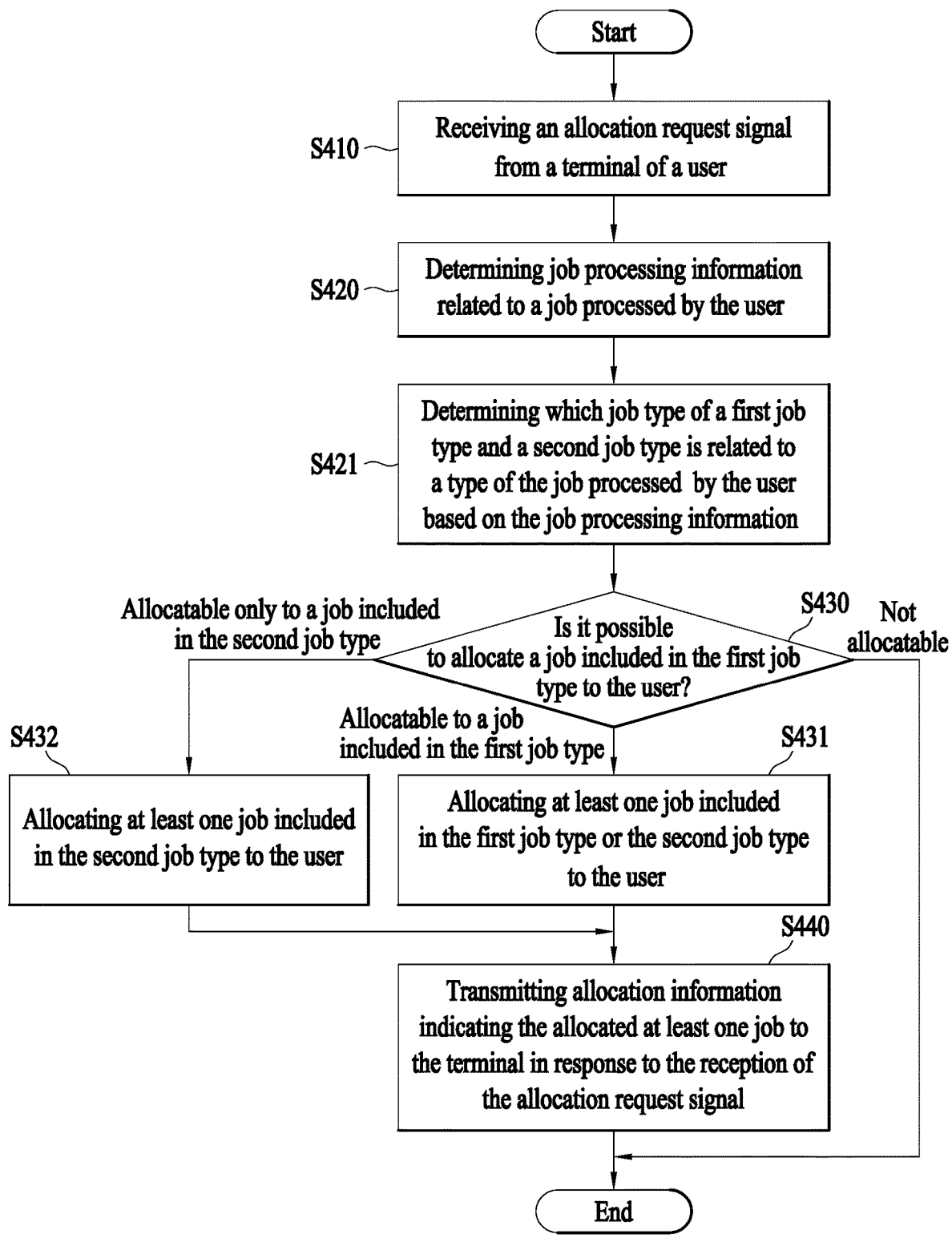
FIG. 4 is a flowchart of a job allocation method for allocating jobs included in a job type related to a user among a first job type and a second job type according to an embodiment.

FIG. 4 is a flowchart of a job allocation method for allocating jobs included in a job type related to a user among a first job type and a second job type according to an embodiment. According to an embodiment, features of operation S410, S420, and S440 of FIG. 4 may be the same or similar to those of operation S210, S220, and S240 of FIG. 2, and thus detailed description thereof will be omitted.

In operation S421, job allocation apparatus 100 may determine which of the first job type and the second job type is related to the job type processed by the user based on the job processing information according to an embodiment. According to an embodiment, the first job type may be defined as a job type capable of obtaining information on or regarding a job processing quantity indicating a quantity of goods processed by a user, and the second job type be defined as a job type that cannot obtain information on a job processing quantity.

According to an embodiment, a job type capable of quantitatively digitizing the quantity of goods processed by the user (for example, picking job for putting displayed products on the tote, packaging job, receiving job which is a scanning operation to move the product to the Fulfillment Center (FC), stowing job for displaying the goods by floor, rebin job for classifying goods in totes by box, etc.) may be determined as a first job type among various job types that a user can perform. In contrast, a job type in which it is difficult to measure the degree of job performance in a predetermined product unit (for example, a job type that only indirectly assists an operation related to the first job type) may be determined as the second job type.

According to an embodiment, the controller 120 may acquire a job type history performed by the user in the past. According to an embodiment, the controller 120 may determine that the user is related to the first job type when the first job type is included in the job type performed by the user in the past, otherwise the user may be determined to be related to the second job type.

In operation S430, the job allocation apparatus 100 may determine whether jobs included in the first job type can be allocated to the user.

According to an embodiment, the controller 120 may determine whether there is a job that can be allocated to the user based on a result of determining whether the job type related to the user is the first job type or the second job type. According to an embodiment, the controller 120 may set a job type to be performed in advance, and may allocate a user to the corresponding job type only when the preset job type corresponds to the job type related to the user. For example, if the second job type is not included in the preset job type that can be allocated at the time when the job allocation is received, the controller 120 does not allocate a job to the user related to the second job type.

According to an embodiment, the controller 120 may allocate jobs to a user related to the first job type and a user related to the second job type based on different criteria. For example, the controller 120 may allocate at least one job included in the first job type or the second job type to a user related to the first job type. That is, a user related to the first job type may be allocated to all job types included in the first job type and the second job type. In contrast, a user related to the second job type can be allocated only to the job type included in the second job type.

According to an embodiment, when it is determined in operation S410 that the user of the terminal transmitting the allocation request signal is capable of being allocated to a job included in the first job type, the job allocation apparatus 100 may allocate at least one job included in the first job type or the second job type to the user in operation S431.

According to an embodiment, when it is determined in operation S410 that the user of the terminal transmitting the allocation request signal is capable of being allocated to a job included in the second job type only, the job allocation apparatus 100 may allocate at least one job included in the second job type to the user in operation S432.

Figure 5:
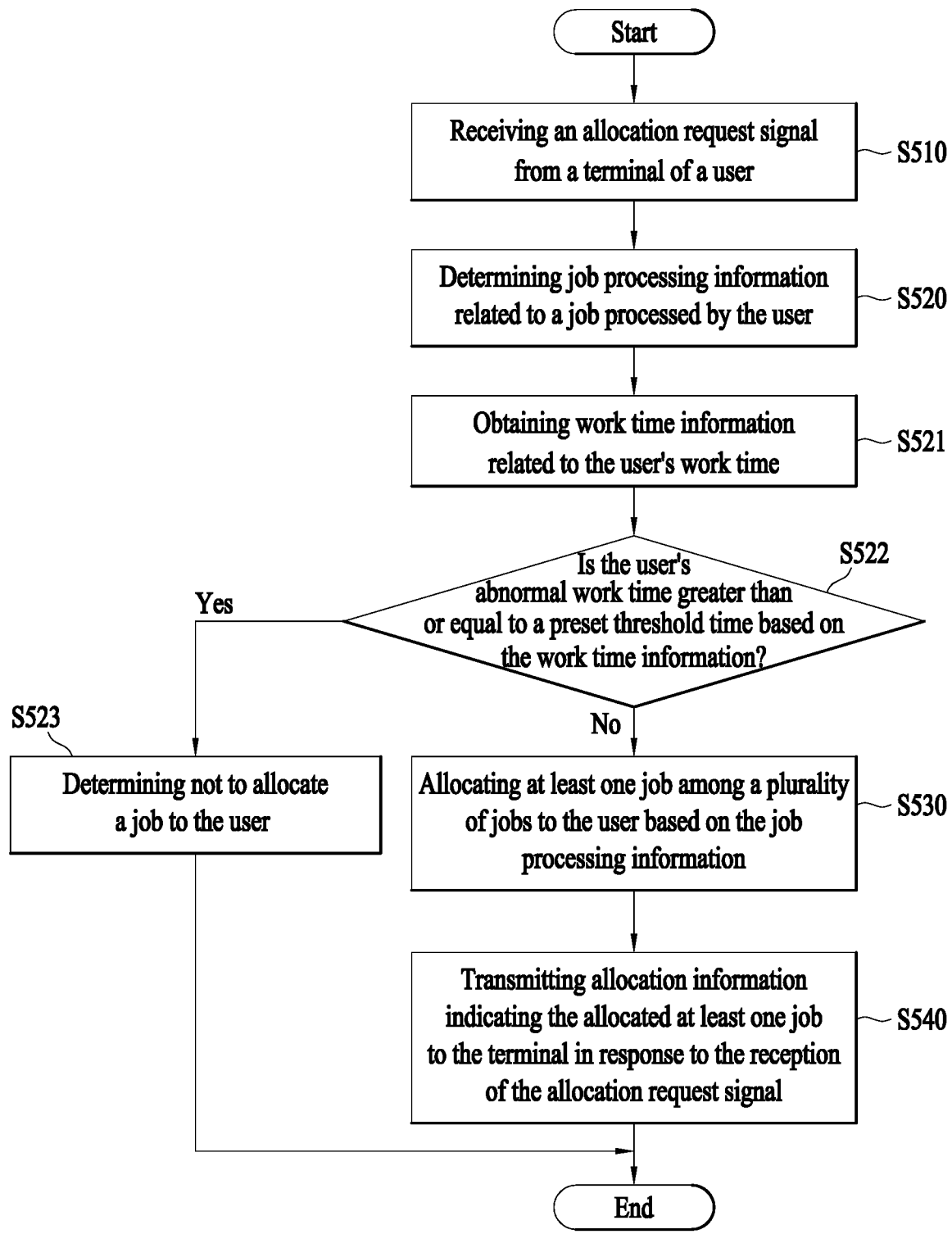
FIG. 5 is a flowchart of a job allocating method including a process of deciding whether to allocate a job to a user in consideration of the work time of the user according to an embodiment.

FIG. 5 is a flowchart of a job allocating method including a process of deciding whether to allocate a job to a user in consideration of the work time of the user according to an embodiment. Features of operation S510, S520, S530, and S540 of FIG. 5 may be the same or similar to those of operation S210, S220, S230, and S240 of FIG. 2, and thus detailed description thereof will be omitted.

According to an embodiment, the controller 120 may obtain work time information related to a user's work time. According to an embodiment, the work time information may include at least one of information such as the date, time, and number of times the user worked, or the number of times in which the user did not perform the allocated job. According to an embodiment, the user's work time information may be information stored in a storage unit (not shown) included in the job allocation apparatus 100 or information obtained from an external server. According to an embodiment, the controller 120 may determine not to allocate a job to the user when it is determined that the user's abnormal work time is greater than or equal to a preset threshold time based on the work time information. According to an embodiment, the controller 120 may determine that the job has not been performed after being allocated a job based on the work time information, and determine whether or not the abnormal work time indicates a predetermined threshold time or more based on the work time information.

According to an embodiment, when it is determined that the abnormal work time of the user is greater than or equal to a preset threshold time based on the work time information, the job allocation apparatus 100 may determine not to allocate a job to the user in operation S523. For example, the controller 120 may determine not to allocate a job to a user who has been absent from work without permission for more than 3 days. Also, when it is determined that the user of the terminal that has transmitted the allocation request signal has worked abnormally for 4 cumulative days based on the obtained information, it may be determined that the corresponding user is not allocated to a job.

According to an embodiment, if it is indicated that a user has continuously worked more than a preset number of times based on the work time information, the controller 120 may determine to allocate the at least one job to the corresponding user. For example, when there is a contention between users having the same final score, the controller 120 may determine to preferentially allocate a job to a user who has worked continuously for a predetermined number of times or more, or a user who has a greater number of consecutive work times.

Figure 6:
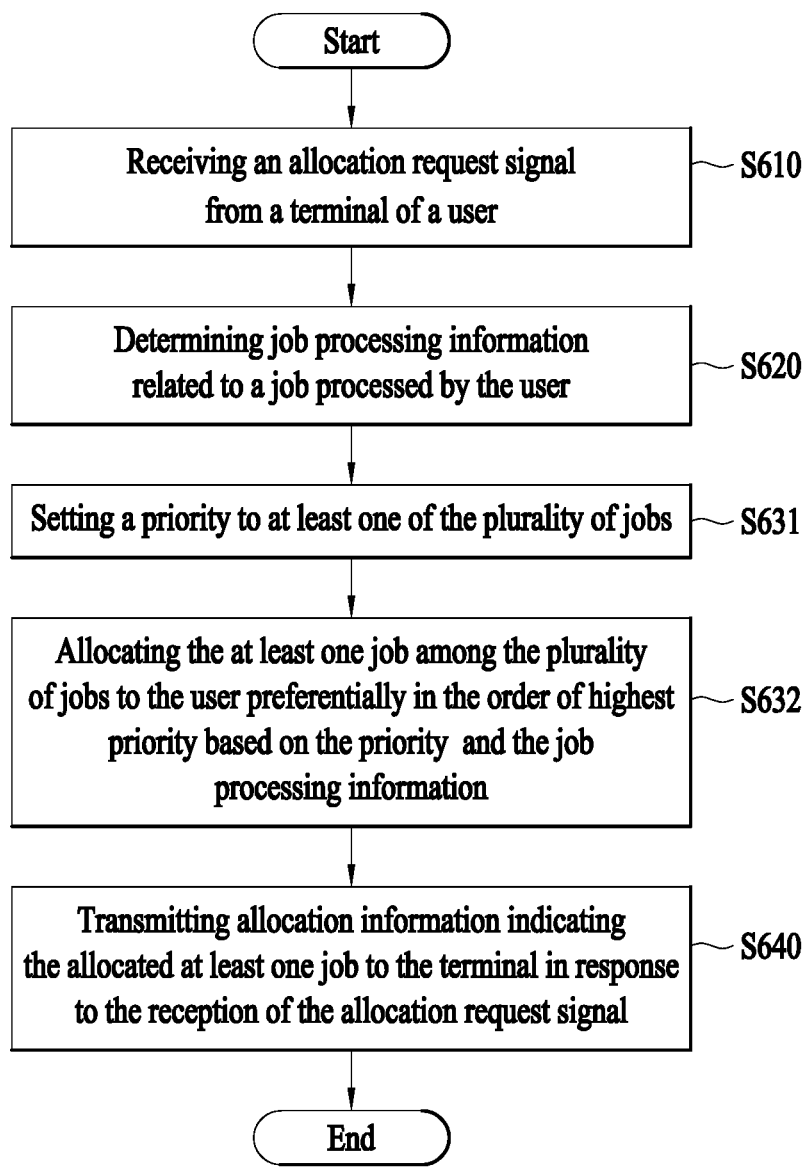
FIG. 6 is a flowchart of a job allocation method for allocating at least one job to a user based on information about a priority set to allocate jobs according to an embodiment.

FIG. 6 is a flowchart of a job allocation method for allocating at least one job to a user based on information about a priority set to allocate jobs according to an embodiment. Features of operation S610, S620, and S640 in FIG. 6 may be the same or similar to those of operation S210, S220, and S240 of FIG. 2, and thus detailed description thereof will be omitted.

In operation S631, the job allocation apparatus 100 may set a priority for at least one of a plurality of jobs according to an embodiment. The priority set according to an embodiment may be arbitrarily set by the user through the job allocation apparatus 100, or may be automatically set in consideration of a ratio of failing to fill the allocation target number, time remaining until the job opening end time, and the like.

In operation S632, the job allocation apparatus 100 may preferentially allocate at least one job among a plurality of jobs to the user in the order of priority, based on the job processing information and the priority set according to an embodiment.

According to an embodiment, the controller 120 may determine whether priority is set in at least one of a plurality of jobs. When it is determined that a priority is set in at least one of a plurality of jobs according to an embodiment, the controller 120 may preferentially allocate a user to at least one job in which the priority is set. For example, the controller 120 may allocate a job to the user based on at least one of the first score and the second score with respect to the job with priority. According to an embodiment, the controller 120 may treat a job in which a priority is not set among a plurality of jobs as a job that has no priority compared to a job in which priority is set. A method of allocating jobs to users based on job processing information for each job for which priority has been set has been described through various embodiments, and thus a detailed description thereof will be omitted.

Figure 7A:
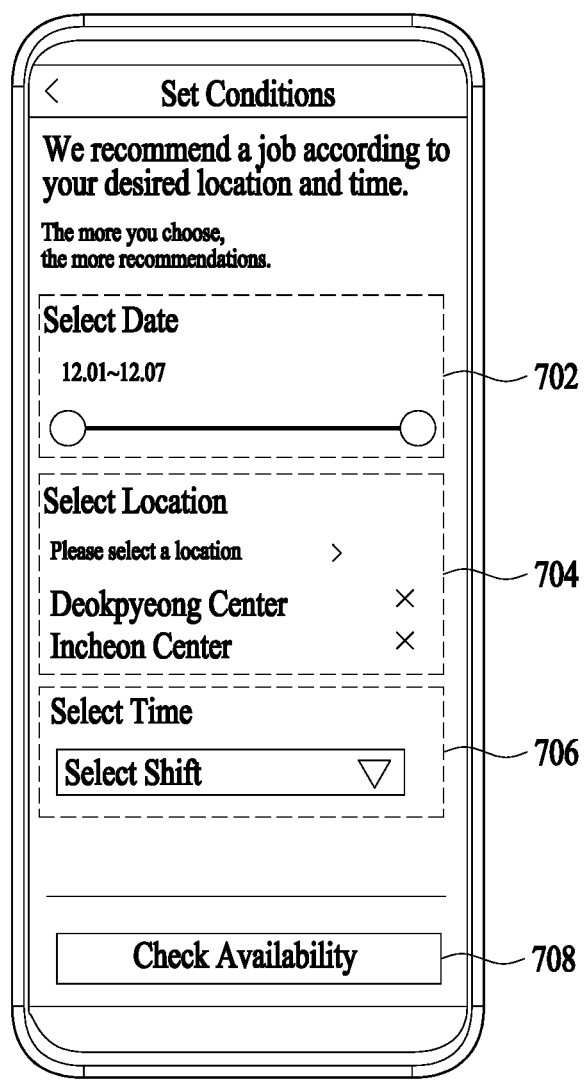
FIGS. 7A to 7C are diagrams illustrating a process in which a user is allocated to a job as the user requests a job allocation according to an embodiment.
Figure 7B:
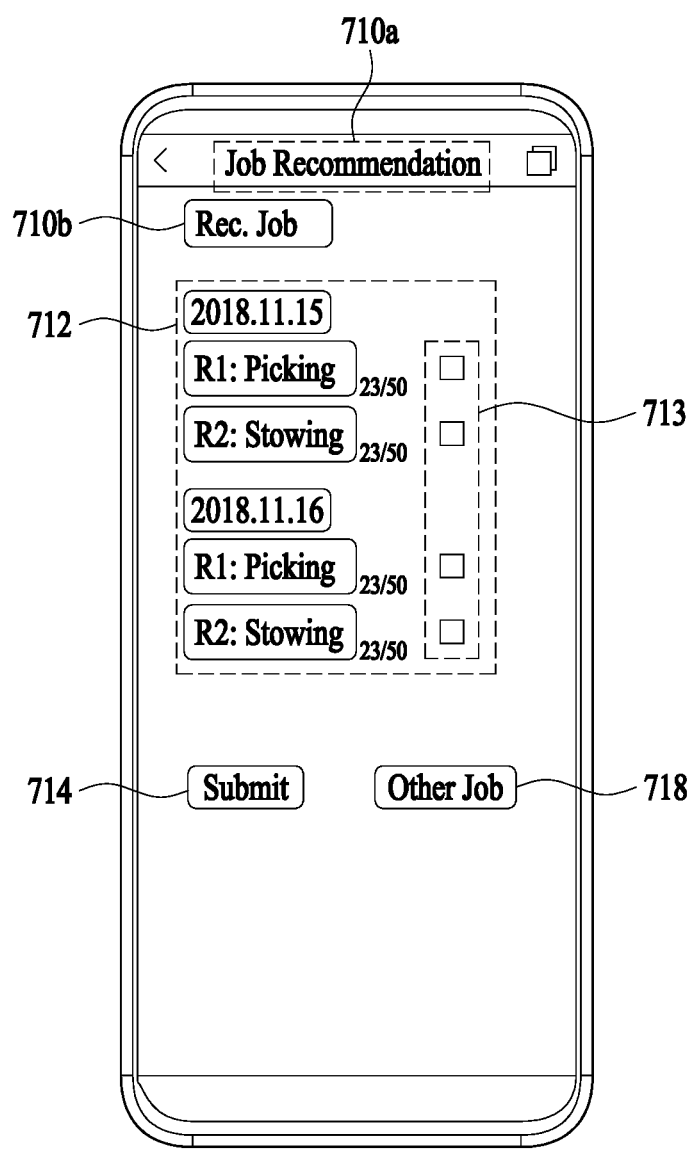
Figure 7C:
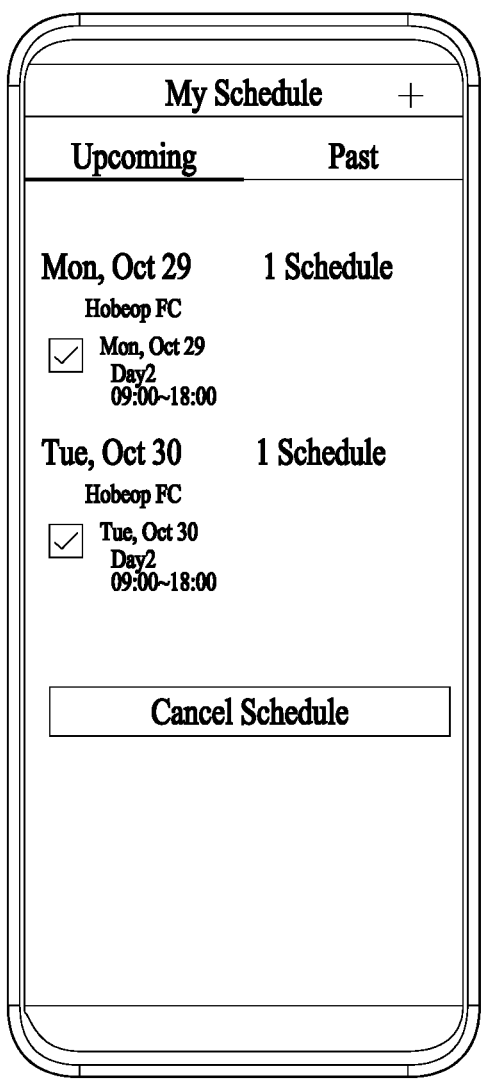

FIGS. 7A to 7C are diagrams illustrating a process in which a user is allocated a job as the user requests a job allocation according to an embodiment.

FIG. 7A illustrates an exemplary screen for a user to request job allocation through a terminal according to an embodiment.

According to an embodiment, the user may set a work date range 702, a work location 704, and a work time slot 706 through the terminal. According to an embodiment, the above-described various pieces of information input through the terminal may be included in the allocation request signal, and the allocation request signal may be transmitted to the job allocation apparatus 100 by selecting a predetermined object 708 on the user interface.

FIG. 7B illustrates information displayed on a screen of a terminal receiving allocation information for a job allocated to a user when a job is allocated to the user by the job allocation apparatus 100 receiving the allocation request signal according to an embodiment.

According to an embodiment, after the job allocation apparatus 100 allocates a job to a user through various embodiments, when allocation information indicating at least one job allocated to the user is transmitted to the user's terminal, the user may be provided with various pieces of information on the allocated job through a user interface displayed on the terminal.

According to an embodiment, when a job is allocated to a user through a job allocation method, the terminal may display additional objects 710a and 710b indicating that the job is allocated through various embodiments described above.

According to an embodiment, allocation information received by the terminal from the job allocation apparatus 100 may include at least one of a work date, a job type, an allocation target number, an actual allocated number, or a work time slot. The terminal may provide the allocation information 712 received from the job allocation apparatus 100 to the user through the user interface.

According to an embodiment, the job allocation apparatus 100 may automatically allocate a job while transmitting the allocation information to the terminal.

According to an embodiment, after transmitting the allocation information to the terminal, the job allocation apparatus 100 may receive allocation confirmation information confirming that at least one of the at least one job included in the allocation information is to be performed from the terminal. The job allocation apparatus 100 may allocate a user to a job based on the allocation confirmation information received in response to delivery of the allocation information. Referring to FIG. 7B, the user can transmit the allocation confirmation information to the job allocation apparatus 100 by selecting the object 714 for transmission of the allocation confirmation information displayed on the terminal.

According to an embodiment, the user's terminal may display a selection object 713 for selecting at least one of at least one job included in the allocation information received from the job allocation apparatus 100. According to an embodiment, the user selects at least a part of at least one job included in the allocation information through the selection object 713 and selects an object 714 for transmission of allocation confirmation information to request to the job allocation apparatus 100 to allocate only the selected job. According to an embodiment, the job allocation apparatus 100 may allocate a user to a job selected by the user based on the received allocation confirmation information.

According to an embodiment, the user's terminal may further display an object 718 for selecting a job other than at least one job included in the allocation information received by the terminal through various embodiments described above. When the object 718 is selected, the terminal may display a user interface to the user for creating various pieces of information to request job allocation. For example, the user interface displayed by selecting the object 718 may include various pieces of information necessary to perform jobs, such as a work date, work time, job type, allocation target number, actual allocated number, work location, and so on. The user's terminal provides the user with a specific time, location, date, and job type based on various pieces of information provided through the user interface, and delivers predetermined information requesting to allocate at least one job in which the user selected based on that information.

FIG. 7C illustrates a user interface including information on or regarding jobs allocated to a user according to an embodiment.

According to an embodiment, the job allocation apparatus 100 receiving the allocation confirmation information may allocate at least one job selected by the user to the user. According to an embodiment, the user's terminal may provide the user with information on or regarding the job through the user interface for at least one job of which allocation is completed. According to an embodiment, if the user has already been allocated to at least one job when the job allocation apparatus 100 transmits the allocation information to the terminal, the terminal may check information about at least one job allocated according to the allocation information delivered from the job allocation apparatus 100. According to an embodiment, when the job allocation apparatus 100 allocates a job to a user based on the allocation confirmation information delivered from the terminal, information on or regarding at least one job allocated according to the allocation confirmation information delivered to the job allocation apparatus 100 can be checked.

The job allocation method for the present disclosure described above may be provided by recording on a computer-readable recording medium as a program for executing on a computer. The job allocation method according to the present disclosure may be executed through software. When executed through software, the configuration means of the present disclosure are code segments that perform necessary tasks. The program or code segments can be stored in a processor readable medium.

The computer-readable recording medium includes all types of recording devices in which data readable by a computer system are stored. Examples of computer-readable recording devices include ROM, RAM, CD-ROM, DVD±ROM, DVD-RAM, magnetic tapes, floppy disks, hard disks, and optical data storage devices. In addition, the computer readable recording medium may be distributed over network coupled computer devices so that the computer readable code is stored and executed in a distributed manner.

The above-mentioned disclosures are capable of various substitutions, modifications and changes within the scope of the technical spirit of the embodiments for those skilled in the art to which the present disclosure pertains, and thus they are not limited by above-described embodiments and accompanying drawings.

What is claimed is:

1. A method operable by an electronic apparatus to allocate a job to a user, the method comprising:
    receiving, by a communications receiver of the electronic apparatus over a network, an allocation request signal from a terminal of the user;
    determining, by a processor of the electronic apparatus, job processing information related to a job performed by the user, wherein the job processing information comprises a first score including a normalized job throughput units per hour for at least one job type;
    determining, by the processor, an allocation target number and an actual allocated number associated with at least one of a plurality of jobs, the allocation target number representing a target number of users to be allocated to the at least one of the plurality of jobs and the actual allocated number representing a current number of users allocated to the at least one of the plurality of jobs;
    determining a second score including a ratio of: i) a difference between the allocation target number and the actual allocated number, and ii) the allocation target number;
    combining the first score and the second score;
    allocating, by the processor, at least one job among the plurality of jobs to the user for the user to perform based on the combined first score and the second score; and
    transmitting, by a communications transmitter of the electronic apparatus to the terminal of the user over the network, allocation information indicative of the at least one job allocated to the user for the user to perform in response to the receiving of the allocation request signal.

2. The method of claim 1, wherein the first score further includes job throughput units per hour for each job performed by the user among the plurality of jobs.

3. The method of claim 2, wherein the allocating of the at least one job to the user comprises:
    determining a job opening end time associated with at least one of a plurality of jobs;
    wherein determining the second score is further based on: a difference between the job opening end time and a time at which the allocation request signal is received.

4. The method of claim 3, wherein the second score comprises normalized information.

5. The method of claim 1, wherein the determining of the job processing information related to the job performed by the user comprises:
    determining, based on the job processing information, whether the job performed by the user corresponds to a first job type for which a job processing quantity may be obtained or a second job type for which a job processing quantity cannot be obtained.

6. The method of claim 5, wherein the allocating at the least one job to the user comprises:
    determining whether a job included in the job type associated with the user among the first job type or the second job type can be allocated to the user or not.

7. The method of claim 6, wherein the allocating at least one job to the user further comprises:
    allocating at least one job of the first job type or the second job type, in response to the user being associated with the first job type; and
    allocating at least one job of the second job type, in response to the user being associated with the second job type.

8. The method of claim 1, further comprising:
    obtaining work time information related to the user's work time; and
    determining not to allocate the at least one job to the user if it is determined that the user's work time is greater than or equal to a preset threshold amount of time based on the work time information.

9. The method of claim 8, further comprising:
    determining to allocate the at least one job to the user preferentially in response to determining that the user has continuously worked more than a preset number of times based on the work time information.

10. The method of claim 1, wherein the allocating of the at least one job to the user comprises:
    setting a priority to the at least one of the plurality of jobs; and
    allocating the at least one job corresponding to the job processing information among the plurality of jobs to the user in an order of highest priority based on the set priority.

11. An apparatus for allocating a job to a user, the apparatus comprising:
    a communications receiver configured to receive an allocation request signal from a terminal of the user over a network; and
    a processor configured to:
        determine job processing information related to a job performed by the user, wherein the job processing information comprises a first score including a normalized job throughput units per hour for at least one job type;
        determine an allocation target number and an actual allocated number associated with at least one of a plurality of jobs, the allocation target number representing a target number of users to be allocated to the at least one of the plurality of jobs and the actual allocated number representing a current number of users allocated to the at least one of the plurality of jobs;
        determine a second score including a ratio of: i) a difference between the allocation target number and the actual allocated number, and ii) the allocation target number;
        combine the first score and the second score;
        allocate at least one job among the plurality of jobs to the user for the user to perform based on the combined first score and the second score; and
    a communications transmitter configured to transmit, to the terminal of the user over the network, allocation information indicative of the at least one job allocated to the user for the user to perform in response to the receiving of the allocation request signal.

12. The apparatus of claim 11, wherein the first score further includes job throughput units per hour for each job performed by the user among the plurality of jobs.

13. The apparatus of claim 12, wherein the processor is further configured to:
    determine a job opening end time associated with at least one of a plurality of jobs;
    wherein determining the second score is further based on:
        a difference between the job opening end time and a time at which the allocation request signal is received.

14. The apparatus of claim 13, wherein the second score comprises normalized information.

15. The apparatus of claim 11, wherein the processor is further configured to determine, based on the job processing information, whether the job performed by the user corresponds to a first job type for which a job processing quantity may be obtained or a second job type for which a job processing quantity cannot be obtained.

16. The apparatus of claim 15, wherein the processor is further configured to determine whether a job included in the job type associated with the user among the first job type or the second job type can be allocated to the user or not.

17. The apparatus of claim 16, wherein the processor is further configured to allocate at least one job of the first job type or the second job type, in response to the user being associated with the first job type, and allocate at least one job of the second job type, in response to the user being associated with the second job type.

18. The apparatus of claim 11, wherein the processor is further configured to set a priority to the at least one job of the plurality of jobs, and preferentially allocate a job with a high priority to the user based on the set priority.

* * * * *